United States Patent
Sundberg

(10) Patent No.: US 10,753,387 B2
(45) Date of Patent: Aug. 25, 2020

(54) BALL PIN CONNECTOR

(71) Applicant: Kongsberg Automotive AB, Mullsjoe (SE)

(72) Inventor: Patrik Sundberg, Habo (SE)

(73) Assignee: Kongsberg Automotive AB, Mullsjoe (SE)

( * ) Notice: Subject to any disclaimer, the term of this patent is extended or adjusted under 35 U.S.C. 154(b) by 611 days.

(21) Appl. No.: 15/520,487

(22) PCT Filed: Oct. 20, 2014

(86) PCT No.: PCT/EP2014/072434
§ 371 (c)(1),
(2) Date: Apr. 20, 2017

(87) PCT Pub. No.: WO2016/062326
PCT Pub. Date: Apr. 28, 2016

(65) Prior Publication Data
US 2017/0314611 A1 Nov. 2, 2017

(51) Int. Cl.
*F16C 11/06* (2006.01)
*F16C 11/08* (2006.01)

(52) U.S. Cl.
CPC ........ *F16C 11/069* (2013.01); *F16C 11/0638* (2013.01); *F16C 11/086* (2013.01);
(Continued)

(58) Field of Classification Search
CPC . F16C 11/0638; F16C 11/0652; F16C 11/069; F16C 11/086; B43K 24/084;
(Continued)

(56) References Cited

U.S. PATENT DOCUMENTS 3,084,671 A * 4/1963 Dottlinger ............ B43K 24/084
401/111
3,602,600 A * 8/1971 Kanski ................. B43K 24/084
401/115
(Continued)

FOREIGN PATENT DOCUMENTS

CN 102 537 018 A 7/2012
EP 0 801 238 A1 10/1997
(Continued)

OTHER PUBLICATIONS

International Search Report and Written Opinion for International Application No. PCT/EP2014/072434 dated Jun. 18, 2015; 10 pages.
(Continued)

*Primary Examiner* — Matthew R McMahon
(74) *Attorney, Agent, or Firm* — Howard & Howard Attorneys PLLC

(57) ABSTRACT

A ball pin connector includes a sleeve-like housing having a cavity with an elastic ball bearing. The elastic ball bearing is axially moveable between a lifted up position, and a lower locking position. Cooperating surface structures are provided on an inner wall of the housing and on an outer wall of the elastic ball bearing as a plurality of projecting surface structures arranged circumferentially distributed with gaps in between such that in a first rotational state of the elastic ball bearing within the housing the projecting surface structures are aligned to be able to come into engagement such that the elastic ball bearing is held in the lifted up position, and such that in a second rotational state of the elastic ball bearing the projecting surface structures of the elastic ball bearing are aligned with gaps of the projecting surface structures of the housing.

14 Claims, 6 Drawing Sheets

(52) U.S. Cl.
CPC ............... *Y10T 403/32713* (2015.01); *Y10T 403/32737* (2015.01)

(58) Field of Classification Search
CPC .......... B43K 24/086; Y10T 403/32713; Y10T 403/32721; Y10T 403/32737; Y10T 403/32745; Y10T 403/32762; Y10T 403/32811
See application file for complete search history.

(56) References Cited

U.S. PATENT DOCUMENTS

| | | | | |
|---|---|---|---|---|
| 3,814,524 | A * | 6/1974 | Sperti | B05B 11/0035 401/57 |
| 4,693,628 | A * | 9/1987 | Renk | B60G 7/005 403/135 |
| 4,943,175 | A * | 7/1990 | Heim | B43K 24/084 401/111 |
| 4,991,988 | A * | 2/1991 | Snell | B43K 24/084 401/109 |
| 5,599,003 | A * | 2/1997 | Seemann | H01F 7/124 251/129.2 |
| 6,902,334 | B1 * | 6/2005 | Kung | B43K 7/005 401/109 |
| 7,044,018 | B2 * | 5/2006 | Sanchez | F16C 1/108 403/135 |
| 7,056,125 | B2 * | 6/2006 | Melis | F16C 1/12 403/133 |
| 7,396,183 | B2 * | 7/2008 | Dona Contero | G05G 1/30 403/122 |
| 7,686,530 | B2 * | 3/2010 | Schilz | F16C 11/069 403/141 |
| 7,891,897 | B2 * | 2/2011 | Nanos | B43K 5/16 401/110 |
| 7,931,415 | B2 * | 4/2011 | Namiki | B43K 7/12 401/104 |
| 7,963,715 | B2 * | 6/2011 | Burton | F16C 11/069 362/515 |
| 7,972,072 | B2 * | 7/2011 | Toyama | B43K 24/084 401/109 |
| 8,434,956 | B2 * | 5/2013 | Cabatan | B43K 23/00 401/112 |
| 2007/0245848 | A1 * | 10/2007 | Schulz | F16C 1/108 74/502.6 |
| 2011/0013974 | A1 * | 1/2011 | Orsolini | F16C 7/00 403/132 |

FOREIGN PATENT DOCUMENTS

| | | |
|---|---|---|
| EP | 0 940 591 A1 | 9/1999 |
| GB | 530 144 A | 12/1940 |

OTHER PUBLICATIONS

Machine-Assisted English Language Translation of European Application No. EP 0 940 591 A1 extracted from www.espacenet.com on Jul. 17, 2017; 8 pages.

Machine-Assisted English Language Translation of European Application No. EP 0 801 238 A1 extracted from www.espacenet.com on Jul. 17, 2017; 7 pages.

Machine-Assisted English Language Translation of Chinese Application No. CN 102537018 A extracted from www.espacenet.com on Jul. 17, 2017; 4 pages.

* cited by examiner

BALL PIN CONNECTOR

The subject patent application is the National Stage of International Patent Application No. PCT/EP2014/072434, filed on Oct. 20, 2014, the content of which is incorporated herein by reference in its entirety.

The present invention relates to a ball pin connector having a sleeve-like housing, an elastic ball bearing received therein, which is axially moveable between a lifted up position in which it is free to flex such that a ball of the ball pin connector may be pushed in and be pulled out, and a lower locking position in which it rests with its lower circumferential wall portion on an inwardly directed wall projection of the housing at its lower opening which provides support for the lower circumferential wall portion of the ball bearing around its opening such that it is prevented from flexing and such that a ball pin is prevented from being removed therefrom, wherein the housing and the ball bearing are provided with cooperating surface structures capable to be brought into engagement by relative rotation of the housing and the ball bearing such that the ball bearing is held in the lifted up position, and to be brought by relative rotation of the housing and the ball bearing out of engagement such that ball bearing is pressed down by a spring to the locking position.

Such ball pin connectors are used for connecting an elongate element, for example the end of a wire of a cable assembly, to a lever including a ball pin, wherein the connection to the ball pin forms a ball joint. Such ball pin connectors have a wide field of application in the automotive industry, e.g. in vehicle gear shift systems.

The ball pin connector has a sleeve-like housing having a cavity, and an elastic ball bearing received therein. The cavity in the housing for receiving the ball bearing is essentially cylindrical and has an inner diameter slightly larger than the diameter of the ball pin, and the elastic ball bearing has an inner diameter corresponding to the outer diameter of the ball pin and an outer diameter matched to the inner diameter of the cavity. The ball bearing is shaped and dimensioned such, when the ball pin is received therein, it extends slightly below the equator of the ball pin the cylindrical cavity of the housing. The cavity has at its lower end adjoining its opening an inwardly projecting wall portion. The ball bearing is axially moveable with respect to the housing between a lifted up position in which the wall portions surrounding its opening at the lower end are free to flex outwardly such that the ball may be pushed in, and a lower locking position in which it rests with its lower circumferential margin surrounding its opening on the inwardly projecting wall portions of the housing. In this lower locking position the circumferential lower margin of the ball bearing surrounding its opening is supported by the inwardly projecting wall portions of the housing such that the lower wall portions of the ball bearing surrounding its opening cannot flex outwardly such that the ball of a ball pin is kept secured in the ball bearing when the latter is in the lower locking position. In the lifted up position of the ball bearing the ball pin may be inserted into or removed from the ball bearing.

There are cooperating surface structures on the housing and on the ball bearing which allow to bring the ball bearing by rotation relative to the housing to a rotational position in which the cooperating surface structures hold the ball bearing engaged in the lifted up position such that a ball pin may be inserted or removed. The cooperating surface structures are arranged such that they may be brought out of engagement by a further rotation of the ball bearing with respect to the housing. When the cooperating surface structures are out of engagement a spring acting between the housing and the ball bearing is urging the latter to the lower locking position in which an inserted ball pin is safely retained in the ball bearing supported by the inwardly projecting wall portions of the housing.

A ball pin connector of this kind is disclosed in EP 0 940 591 B1. This ball pin connector has a housing in which a flexible ball bearing is received. In the lower locking position the ball bearing rests with its circumferential notch in the outer wall at its lower end on an inwardly projecting wall portion of the housing. In this position the lower edge surrounding the opening of the ball bearing is supported by the inwardly projecting wall portions such that a ball received in the ball bearing cannot be removed therefrom.

The ball bearing may be brought into a lifted up position in which it is axially moved within the housing such that the lower edge of the ball bearing is lifted off the inwardly projecting wall portions which is accompanied by a compression of the spring. In the lifted up position the ball pin may be inserted into the ball bearing, while the lower edge of the ball bearing surrounding the opening may flex outwardly to allow the ball pin to pass, whereafter the ball bearing is moved? downwardly under the action of the spring to the lower locking position in which the lower edge of the ball bearing rests on the inwardly projecting wall portion of the housing.

The ball bearing has an upwardly extending projection which extends to the outside of the housing through an opening in the housing. This projection comprises helical ramps which slide on the edges of the opening of the housing. By turning the projection about 90° the helical ramps of the projection are riding on the opening edges and cause an axial displacement of the ball bearing from the locking position into the lifted up position. After the projection has been turned the helical ramps hold the ball bearing in this lifted up position. When the projection is turned back again the ramps slide along the opening edges again, thereby allowing the spring to urge the ball bearing downwardly until it reaches its lower locking position when the projection of the ball bearing has been rotated back.

It is an object of the present invention to provide a ball pin connector which may be operated in a simple manner, when connecting it to a ball pin or when removing it from a ball pin, in particular without need for tools.

This object is achieved by a ball pin connector, comprising the features of claim 1. Preferred embodiments of the invention are set out in the dependent claims.

According to the present invention the cooperating wall structures are provided on the inner wall of the housing and on the outer wall of the ball bearing as a plurality of projecting surface structures arranged circumferentially distributed with gaps in between. In a first rotational state of the ball bearing within the housing the projecting surface structures of the ball bearing and the housing are aligned in circumferential direction. In this manner the projecting surface structures of the housing and the ball bearing are able to come into engagement, with the projecting surface structures of the ball bearing resting on respective projecting surface structures of the housing, such that the ball bearing is held in the lifted up position. The projecting surface structures are arranged such that in a second rotational state of the ball bearing relative to the housing the projecting surface structures of the ball bearing are aligned with gaps of the projecting surface structures of the housing such that they move past each other when the ball bearing is pressed downwardly by a spring to the locking position. Since a plurality of projecting surface structures are circumferentially distributed around the circumference of the ball bearing, and correspondingly a plurality of cooperating projecting surface structures are circumferentially distributed in the cavity of the housing a small rotational movement is sufficient to rotate the ball bearing from a first rotational state with the projecting surface structures aligned to a second rotational state with the respective projecting surface structures disaligned such that they may pass each other when the ball bearing moves down to the locking position under the action of a spring acting between the housing cavity and the ball bearing. Such small rotational movement to move the ball bearing out of or into the first rotational state can be accomplished in a simple manner without need for tools.

An incremental rotational movement of the ball bearing from the first to the second rotational state can be over a relatively small angular step since the circumferentially distributed projecting surface structures only have to be brought from an aligned state to a disaligned state which can be achieved by a rotational step of about half of the circumferential extension of the of the projecting surface structures of the ball bearing. Preferably the projecting surface structures on the ball bearing are circumferentially distributed with equal angular distances in circumferential direction and have equal circumferential extension. Likewise, the projecting surface structures at the inner wall of the housing are located circumferentially distributed at equal angular distances in circumferential direction. For example, there can be twelve projecting surface structures on the outer wall of the ball bearing, each having an angular extension of 20° in circumferential direction with a gap of 10° between adjacent ones. Likewise, there are twelve projecting surface structures on the inner wall of the housing circumferentially distributed such that there is a gap of slightly above 20° between adjacent once. In such embodiment a rotational movement of about 10° is sufficient to move the projecting surface structures of the ball bearing from a state in which they are centered above associated projecting surface structures on the inner wall of the housing to a state in which each of the projecting surface structures of the ball bearing is disposed in a gap between adjacent two of the projecting surface structures of the housing. It can also be noted that in such configurations with circumferentially evenly distributed projecting surface structures the incremental movement steps from the first rotational state to the second rotational state can be in the same rotational sense or direction, i.e. the ball bearing is brought from the first to the second rotational state and again to the first rotational state etc. by incremental rotations in the same rotational sense. In the above described example this would be subsequent rotational steps of about 10°, for example in anti-clockwise direction, which bring the ball bearing from the first rotational state to the second, back to the first etc.

In particular, in a preferred embodiment these rotational movements are driven by guiding surfaces provided in the cavity and on the ball bearing. These guiding surfaces are arranged to rotate the ball bearing from the first towards the second rotational state within the housing when the ball bearing is moved upwardly in the housing.

Such upward movement of the ball bearing occurs either when the ball pin connector is empty and a ball pin is inserted, or when the ball pin connector is removed from a ball pin. In the first case the ball bearing is in the first rotational state in the lifted up position when the ball pin is inserted into the cavity of the housing. When the ball pin is moved into the ball bearing, wherein the lower wall portion of the ball bearing is flexing outwardly to allow the ball pin to enter, a force is exerted on the ball bearing in upward direction relative to the housing. By continuing to apply such force pressing the ball pin further into the housing of the ball pin connector the ball bearing is moved further upwardly against the action of a spring acting between the housing and the ball bearing. During this upward movement the guiding surfaces slide along each other and cause a rotational movement of the ball bearing from the first rotational state towards the second rotational state. In the second case if the ball pin connector is removed from the ball pin, the ball bearing is first in the second rotational state and in its locking position. Then a force is exerted which urges the ball pin upwardly with respect to the housing, either by pushing the housing down towards the ball pin or by pushing the ball pin up relative to the housing. This causes the ball bearing to move upwardly within the cavity of the housing which brings the guiding surfaces into contact with each other which then, by further sliding long each other drive the ball bearing to rotate from the second rotational state towards the first rotational state to bring it eventually to the first rotational state in the lifted up position whereafter the ball pin can be removed from the ball bearing.

In such an arrangement mounting of the ball pin connector to a ball pin or removing it from the ball pin can be performed by simply exerting manual pressure without need for any tool. When the ball pin connector is to be connected to a ball pin the ball pin is inserted while the ball bearing is in the first rotational state in which it is held in the lifted up position which allows to introduce the ball pin into the ball bearing which is accompanied by flexing the lower wall portions of the ball bearing outwards. By pushing the housing further onto the ball pin the ball bearing is moved upwards within the housing cavity which causes the guiding surfaces to contact each other and to start a rotational movement of the ball bearing from the first rotational stage towards the second rotational state. On the other hand, if a ball pin is present in the ball bearing and the ball bearing is in its locking position, and the ball pin connector is to be removed from the ball pin pressure is exerted on the housing urging it towardly the ball pin. This causes the ball bearing to be moved upwardly within the housing cavity against the action of the spring, and the guiding surfaces use this upward movement to drive a rotational movement that moves the ball bearing away from the second rotational state towards the first rotational state. When reducing the pressure exerted on the housing again the projecting surface structure of the ball bearing and the housing come into engagement when the ball bearing is lowered in the housing until it rests on the projecting surface structures of housing in the lifted up position, whereafter the ball pin may be removed by pulling it out.

In a preferred embodiment at least some of the guiding surfaces for driving the rotation are formed on the projecting surface structures used for holding the ball bearing in the lifted up position in the first rotational state and for allowing the ball bearing to move to the locking position in the second rotational state.

In a preferred embodiment the guiding surfaces comprise inclined surface portions on the outer wall of the ball bearing, which are inclined with respect to the circumferential direction of the ball bearing and which are not parallel to the axial direction of the ball bearing. Such inclined surface portion may for example extend along a small part of a helical projection around the outer wall of the ball bearing. On the inner wall of the cavity protrusions are disposed which are arranged such that, when the ball bearing is move upwardly in the housing, the protrusions contact the inclined surface portions which causes the protrusions to slide along the inclined surface portions when the ball bearing is further moved upwardly with respect to the housing. This sliding movement along the inclined surface portions causes the rotational movement of the ball bearing relative to the housing between the first rotational state in the second rotational state and vice versa, respectively.

In a preferred embodiment the plurality of projecting surface structures on the outer wall of the ball bearing are formed as a plurality of projections, each projection in the form of a double arrow. The arrow tips of each double arrow point in circumferential direction of the ball bearing. Each double arrow comprises a first arrow, wherein the tip of the first arrow adjoins the base of the second arrow of the double arrow. The projecting surface structures on the inner wall of the housing comprise a plurality of circumferentially distributed lower protrusions disposed below the vertical level of the double arrows and arranged such that in the first rotational state of the ball bearing a lower protrusion is disposed in the middle of an associated double arrow such that it engages the associated double arrow in an engagement area where the tip of the first arrow adjoins the base of the second arrow of the double arrow. This arrangement also ensures that the ball bearing is safely kept in the lifted up position since the lower protrusion is received in the recess formed in the middle of the double arrow in the area where the tip of the first arrow adjoins the second arrow.

In a preferred embodiment the lower protrusions form part of the protrusions arranged to act on inclined sliding surfaces to rotate the ball bearing within the housing cavity.

In a preferred embodiment the protrusions on the inner wall of the housing further comprise a plurality of upper protrusions located vertically above the double arrows on the ball bearing, the upper protrusions being circumferentially distributed and shifted with respect to the lower protrusions such that, when the ball bearing is moved upwardly in the housing, the upper protrusions contact upper inclined surface portions of the double arrows to cause a rotational movement of the ball bearing within the housing sufficient to rotate the double arrows with their engagement areas where the first arrow adjoins with its tip the base of the second arrow circumferentially away from the lower protrusions.

In a preferred embodiment the plurality of upper and lower protrusions on the inner wall of the housing and the projecting double arrows on the outer wall of the ball bearing are arranged such that, when the ball bearing is in the first rotational state and is moved upwardly relative to the housing, the upper protrusions contact upper inclined surface portions of the double arrows to rotate the ball bearing within the housing in a first step, and in that, when the ball bearing is moved downwardly again by the spring, the lower protrusions contact lower inclined surface portions of the double arrows to rotate the ball bearing further in a second step to the second rotational state.

In a preferred embodiment the plurality of upper and lower protrusions on the inner wall of the housing and the projecting double arrows on the outer wall of the ball bearing are arranged such that, when the ball bearing is in the second rotational state and is moved upward relative to the housing, the upper protrusions contact upper inclined surface portions of the double arrows to rotate the ball bearing within the housing in a first step, and in that, when the ball bearing is moved downwardly again, the lower protrusions contact lower inclined surface portions of the double arrow structures to rotate the ball bearing further in a second step to the first rotational state.

The invention will in the following be described in more de-tail in connection with a preferred embodiment illustrated in the drawings in which.

Figure 1:
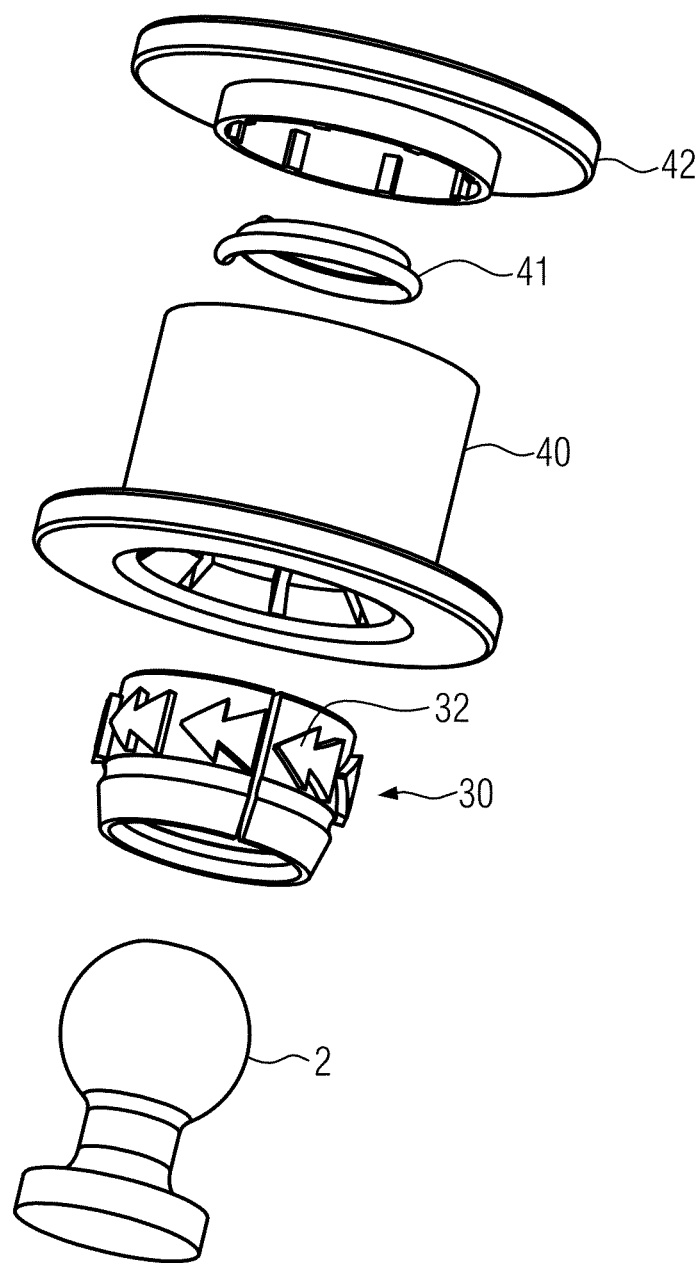
FIG. 1 shows a perspective exploded view of a ball pin connector.

The exploded view of FIG. 1 gives an overview over the main components of the ball pin connector. It shows a sleeve-like housing 40 having a cavity in its interior and being closed by a lid member 42. When the lid member 42 is dismounted an elastic dampener ring (not shown) can be placed around the housing 40 to enclose its outer cylindrical wall. Around this dampener usually a cage ring (not shown) is placed which is connected to a terminal rod (not shown) in which an end of a cable can be fixed. This arrangement allows force to be transmitted from the cable to the ball pin, and is often used in vehicles where commands of a driver are transmitted by a cable to actuate a device coupled to the ball pin.

Figure 2:
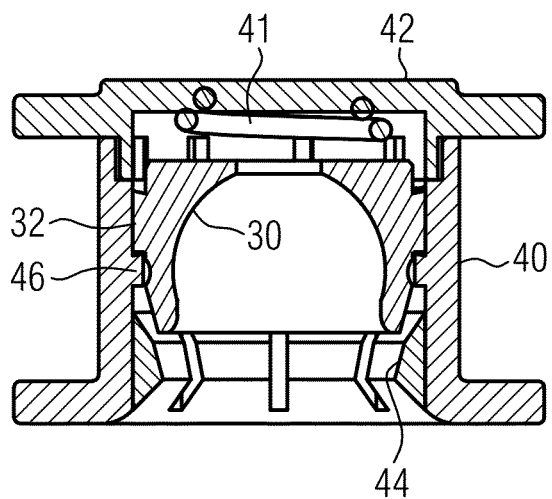
FIG. 2 shows a cross-sectional view of the ball pin connector with the ball bearing being in a first rotational state in a lifted up position within the housing.
Figure 3:
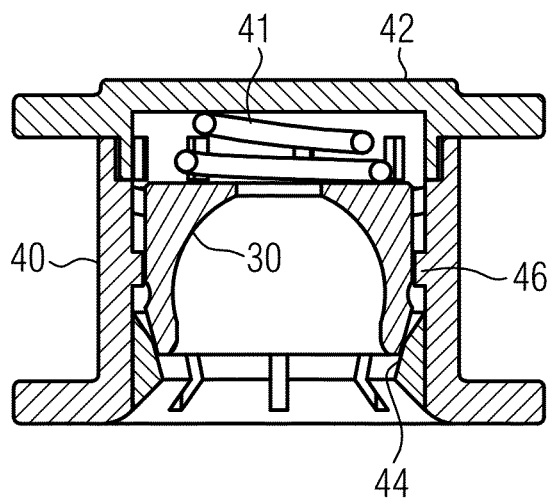
FIG. 3 shows a cross-sectional view of the ball pin connector with the ball bearing being in a second rotational state in a lowered locking position within the housing.

Inside of the cavity of the housing 40 a ball bearing 30 is disposed which provides a spherical inner socket arranged to receive a ball 2 of a ball pin. As can be seen in FIGS. 2 and 3 the ball bearing 30 is dimensioned such that it extends over more than 180°, i.e. reaches with its lower end portion below the equator of a ball 2 when a ball pin is received in the ball bearing 30.

The cavity of the housing 40 is essentially cylindrical except that in the lower end region adjoining the opening of the cavity there is an inwardly directed wall projection 44. When the ball bearing 30 is in its lifted up position the lower end portion of the ball bearing 30 is lifted off the inwardly directed wall projection 44 so that the lower end portion of the ball bearing 30 is free to flex outwardly to allow a ball 2 to be pushed into the ball bearing 30 or to be removed from the ball bearing 30 by pulling the ball pin out.

As can be seen from FIG. 2 the ball bearing 30 is held in the lifted up position by cooperating wall structures, namely by projecting surface structures 46 on the inner wall of the housing cavity, and projecting surface structures 32 on the outer wall of the ball bearing 30. In the first rotational state of the ball bearing 30 within the housing 40 the projecting wall structures 46 on the inner wall of the housing 40 and the projecting walls structures 32 on the outer wall of the ball bearing are vertically aligned to each other such that the projecting wall structures 32 rest on the projecting wall structures 46 on the inner wall of the housing.

In this lifted up position of the ball bearing 30, there is sufficient free space around the lower end portion of the ball bearing 30 such that the wall at the lower end portion of the ball bearing around its opening may be flexed outwardly when a ball 2 of a ball pin is pushed in for mounting or is pulled out for dismounting.

In the following reference will be made to FIG. 4 to describe projecting surface structures on the inner wall of the ball bearing 30 and on the inner wall of the cavity of the housing 40. In this connection it should be noted that FIG. 4 (and likewise FIGS. 5 to 13) are very schematical with many parts and components of the ball pin connector omitted in order to simplify the graphical presentation. For example, projecting surface structures of the inner wall of the housing are shown, whereas the inner wall itself is not shown so that these projections 46 and 48 appear to be in the air, whereas indeed they are projecting from the inner wall of the housing.

Figure 4:
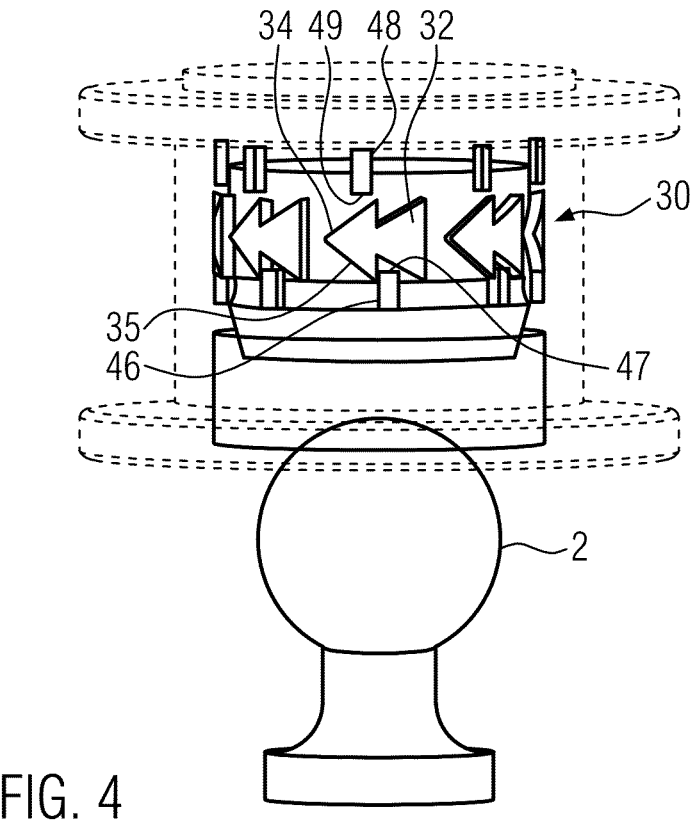
FIGS. 4 to 8 show schematical views illustrating a sequence of states of the ball pin connector during an operation for inserting and locking the ball pin in the ball pin connector.

As can be seen for example from FIG. 4 the projecting wall structures 46 on the inner wall within the housing 40 are circumferentially distributed around the inner wall of the housing 40 with regular gaps in between. Likewise the projecting surface structures 32 on the outer wall of the ball bearing 30 are circumferentially distributed with gaps in between. The circumferential extension of each of the projecting surface structures 32 of the ball bearing 30 is such that it fits in a gap between two adjacent projecting surface structures 46 of the housing 40. In addition, the circumferential distance between two adjacent projecting surface structures 32 of the ball bearing 30 is larger than the circumferential extension of each of the projecting surface structures 46 of the housing 40. Therefore, the ball bearing 30 can be brought from a first rotational state as shown in FIG. 4 in which it is locked by the projecting surface structures 46, 32 in the lifted up position in a first rotational state, to a second rotational state in which the projecting surface structures 32 of the ball bearing 30 are rotated such that each of the projecting surface structures 32 of the ball bearing 30 is located in a gap between respective adjacent two of the projecting surface structures 46 of the housing 40 (see FIG. 8). In this second rotational state spring 41 acting between the housing and the ball bearing is urging the ball bearing downwardly into its lower locking position. In this lower locking position which is shown in the cross-sectional view of FIG. 3 the lower end portion of the ball bearing 30 adjacent its opening rests on the inwardly directed wall projection 44 in the lower end region of the housing 40. Due to this support of the inwardly directed wall projection 44 the lower end portion of the ball bearing 30 is restrained and prevented from being flexed outwardly. Thus, when a ball 2 of a ball pin is received in the socket of the ball bearing 30 and the ball bearing is in its lower locking position the ball 2 of the ball pin is safely locked within the housing 40 of the ball pin connector.

As can be seen from the FIGS. 2 to 13 the projecting surface structures 32 of the ball bearing 30 are formed by circumferentially spaced double arrows, each having a first arrow adjoining with its arrow tip the base of the second arrow, wherein there is circumferential space between the tip of the second arrow and the base of the next first arrow of the adjacent double arrow. Each double arrow has two upper inclined surface portions 34 and two lower inclined surface portions 35.

The projecting surface structures of the housing comprise lower projecting surface structures 46 in the form of projecting bars which are circumferentially distributed at equal distances. The upward facing end face of a lower projecting surface structure 46 is referred to as a lower protrusion 47.

Shifted in circumferential direction there is a corresponding number of upper projecting surface structures 48 of the housing 40. These upper projecting wall structures 48 are likewise formed by inwardly projecting bars on the inner wall of the housing. The downwardly facing end faces of the upper bars are also referred to as upper protrusions 49 herein.

The operation of the ball pin connector will now be described for the operation of assembly of ball pin connector and ball pin with reference to the sequence shown in FIGS. 4 to 8.

Figure 5:
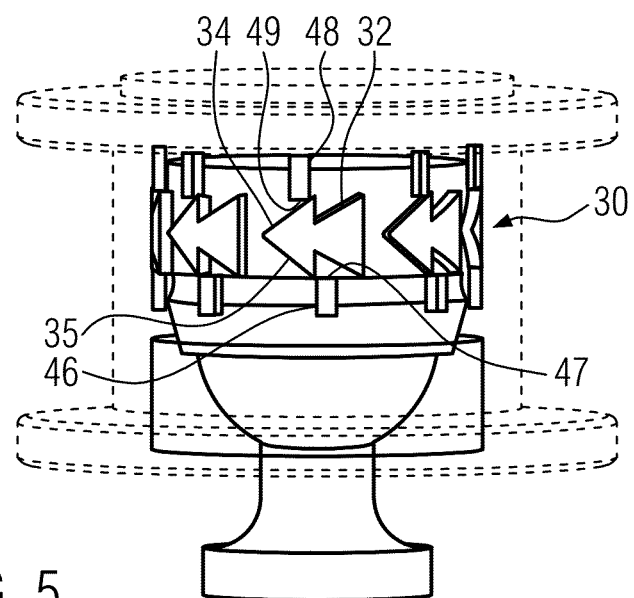

When no ball pin is mounted to the ball pin connector the ball bearing 30 is in the first rotational state in which it is engaged in the lifted up position which is shown in FIG. 4, and in cross-section in FIG. 2. For mounting the ball pin connector on the ball pin the ball pin connector and the ball pin are moved towards each other such that the ball 2 is entering the cavity in the housing 40, as indicated in FIG. 4. In the course of upward movement of the ball 2 relative to the housing 40 the ball 2 will contact the lower end portion of the ball bearing 30, whereby the ball bearing is lifted up and moving further into the cavity, as indicated in FIG. 5. During this movement spring 41 (not shown in FIGS. 4 to 8) acting between the housing 40 and the ball bearing 30 has to be com-pressed. The force exerted by the ball 2 on the lower end portion of the ball bearing 30 is sufficient such that the walls of the lower end portion of the ball bearing 30 are flexed outwardly. This outward flexing of the lower end portions of the wall of the ball bearing 30 is possible when these lower end portions of the ball bearing 30 are lifted off the inwardly directed wall projection 44 in the cavity of the housing 40.

When the circumferential lower end wall portion of the ball bearing 30 is sufficiently flexed outward the ball 2 can pass the opening of the ball bearing 30 and move into the interior of the ball bearing 30. During this movement the ball bearing 30 is moved further upwardly within the housing 40 from FIGS. 5 to 6 until the ball 2 is fully received in the ball bearing 30.

Figure 6:
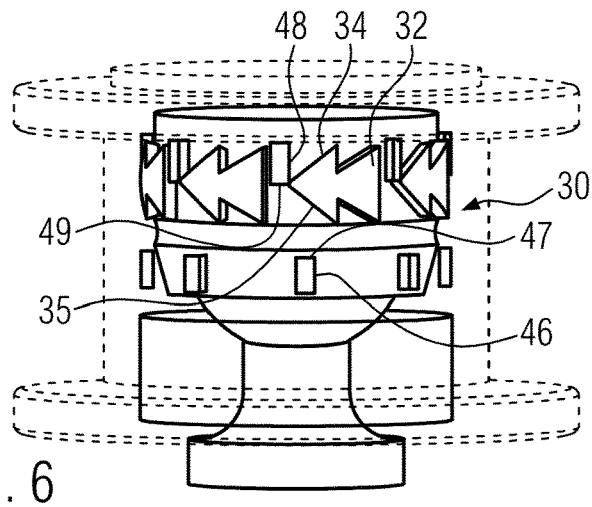

During the upward movement of the ball bearing between FIGS. 5 and 6 upper inclined surface portions 34 of the double arrows come into contact with the upper protrusions 49 of the upper projecting surface structures 48. When the ball bearing is then further moved upwardly the upper inclined surface portions 34 of the double arrows slide along the upper protrusions 49 which causes a rotational movement of the ball bearing 30 within the housing 40. In the transition between FIGS. 5 and 6 the upward movement of the ball bearing 30 is accompanied by a rotation of the ball bearing in anti-clockwise direction (in a view from above), which rotation brings the engagement areas of the double arrows formed in the region where the tip of the first arrow adjoins the base of a second arrow is moved out of vertical alignment with a corresponding lower projecting surface structure 46 such that each lower projecting surface structure 46 is now located vertically below an inclined surface portion 35 of a second arrow of the associated double arrow, as shown in FIG. 6.

Figure 7:
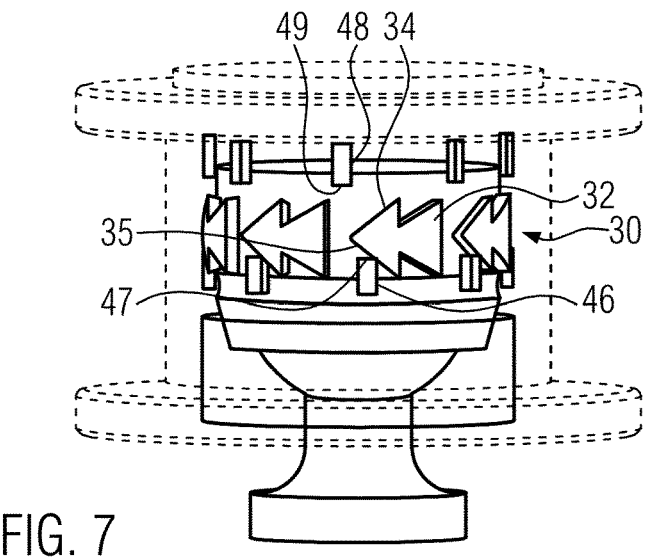

When the force pressing ball pin connector and ball pin together is released, the spring 41 pushes the ball bearing together with the received ball pin downwardly with respect to the housing 40. In the course of this downward movement of the ball bearing 30 within the housing 40, lower inclined surface portions 35 of the double arrows come into contact with lower protrusions 47 formed by the upwardly facing end faces of the lower projecting surface structures 46, as shown in FIG. 7.

Figure 8:
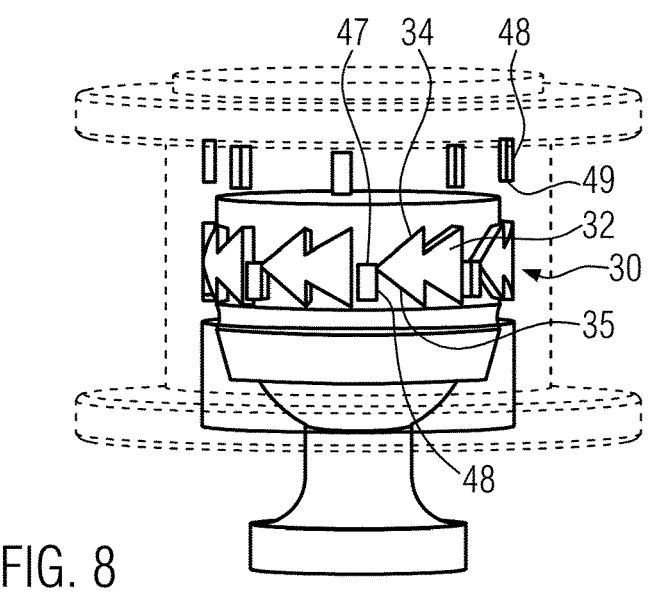

When the ball bearing is now further moving downwardly within the housing 40 the lower inclined surface portions 35 slide along lower protrusions 47 which is causing a further rotational movement of the ball bearing 30 in anti-clockwise direction (when looking form above). This further rotational movement of the ball bearing 30 brings the ball bearing to the second rotational state within the housing 40 as shown in FIG. 8.

In this second rotational state the projecting surface structures 32 of the ball bearing 30 in the form of the double arrows have rotated with respect to the lower projecting surface structures 46 of the housing sufficiently so that each projecting surface portion 32 of the ball bearing is located in a gap between adjacent of the lower projecting surface structures 46 of the housing so that the projecting surfaces structures 32 of the ball bearing 30 may move vertically past the lower projecting surface structures 46 of the housing 40 as far as it is required for the ball bearing to reach the lower locking position. In the lower locking position in which lower end wall portion of the ball bearing is resting on the inwardly directed wall projection 44 of the cavity of the housing 40. In this manner the circumferential end wall portion of the ball bearing 30 adjoining its lower opening is supported by the inwardly directed wall projection 44 such that it cannot flex in outward direction so that the ball pin is safely locked in the ball pin connector.

In order to disassemble the ball connector form the ball pin the ball pin connector and the ball pin have to be pressed against each other once more, either by pressing the housing 40 down onto the ball pin or by pressing the ball pin upwardly into the housing 40. The sequence of states during such dismounting operation is illustrated in FIGS. 9 to 13.

Figure 9:
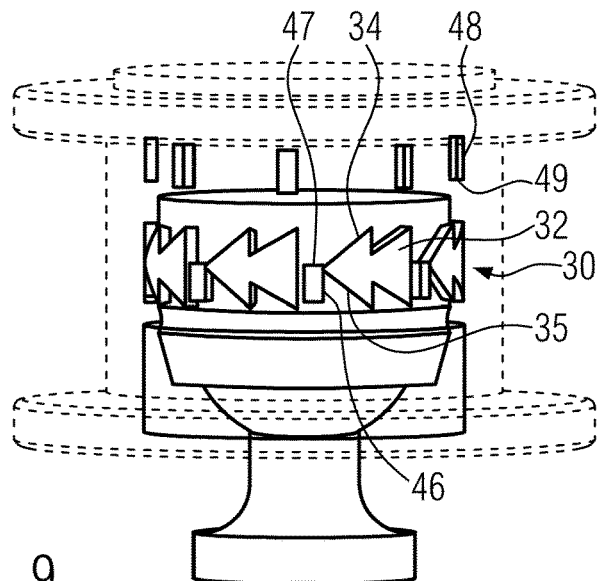
FIGS. 9 to 13 show schematical views illustrating a sequence of states of the ball pin connector during an operation for dismounting and removal of the ball pin from the ball pin connector.
Figure 10:
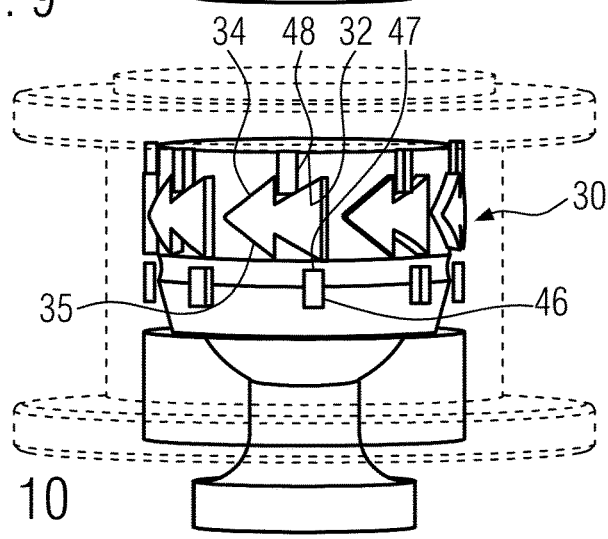

When the ball of a ball pin is locked in the ball bearing 30, with the ball bearing 30 being in the lower locking position, the ball bearing 30 is in the second rotational state as shown in FIG. 9 in which each of the double arrows on the outer wall of the ball bearing 30 is aligned with a gap between two adjacent lower projecting surface structures 46. To start the dismounting procedure a force is applied which urges the ball bearing 30 in upward direction relative to the housing 40, i.e. by exerting a downwardly directed force on the housing with a corresponding counter-force on the ball pin or vice versa. Due to this force the ball bearing 30 is moved upwardly within the housing 40. In the course of this movement upper inclined surface portions 34 of first arrows of the double arrows will come into contact with the upper protrusions 49 of the upper projecting surface structures 48. While the ball bearing 30 is moved further in upward direction the upper inclined surface portions 34 which are in contact with upper protrusions 49 slide along the upper protrusions 49. This causes a rotational movement of the ball bearing 30 within the housing 40 in anti-clockwise direction (viewed from above). The double arrows are now no longer aligned with gaps between the lower projecting surface structures 46. Rather the lower projecting surface structures 46 are now in the area of the lower inclined surface portions 35 of the first arrows of the double arrows, as can be seen in FIG. 10.

Figure 11:
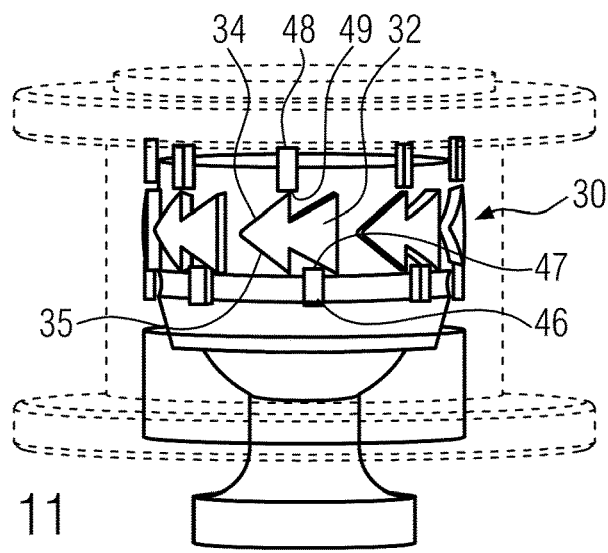

Now the force pushing the ball bearing 30 upwards within the housing is released. Due to the force of the spring 41 (not shown in FIGS. 9 to 13) the ball bearing 30 is then moved downwardly again. Eventually the lower protrusions 47 of the lower projecting surface structures 46 come into contact with the lower inclined surface portions 35 of the first arrows of the double arrows (see FIG. 11). This causes a sliding movement of the lower inclined surface portions 35 of the double arrows along the lower protrusions 47 which is accompanied by a further rotation of the ball bearing 30 within the housing 40 in anti-clockwise direction, as can be seen in FIG. 11.

Figure 12:
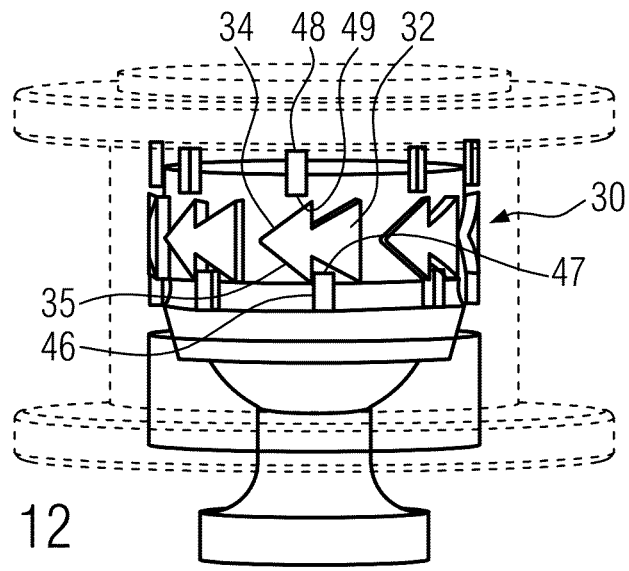
Figure 13:
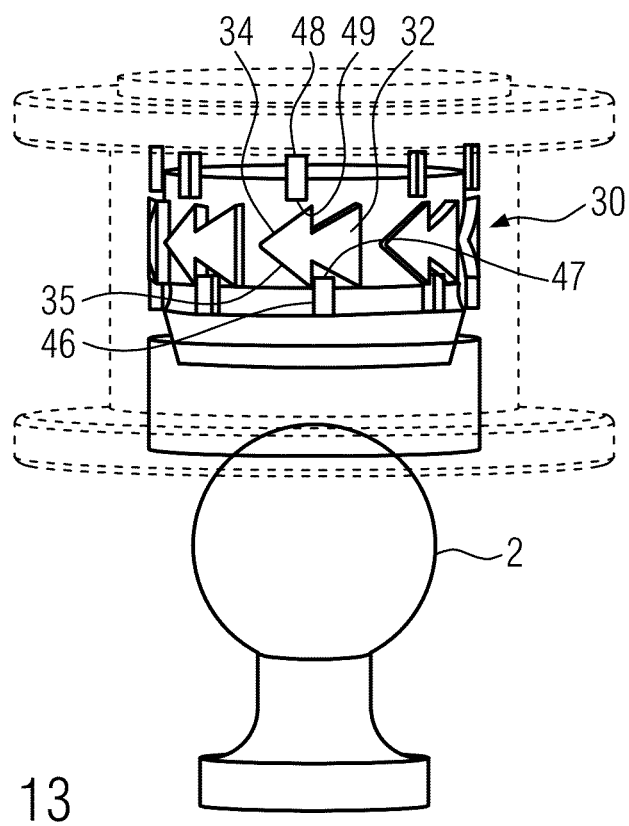

Eventually the lower projecting surface structures 46 will come into contact with a portion of the base of the second arrow of the double arrows which stops further rotation (see FIG. 12). In this manner the ball bearing 30 has reached the first rotational state in which the double arrows are engaged with the lower projecting surface structures 46. By this engagement the ball bearing 30 is locked in the lifted up position in which the lower end portion of the ball bearing 30 is lifted off the inwardly directed wall portion 44 of the housing. In this state the lower end wall portions of the ball bearing are free to be flexed in outward direction. When the ball pin is now pulled out the lower end portion of the ball bearing 30 is flexed in outward direction until the opening of the ball bearing 30 is stretched sufficiently open so that the ball 2 of the ball pin may pass the opening and be pulled out of the ball bearing, as shown in FIG. 13.

The invention claimed is:

1. A ball pin connector comprising:
a sleeve-like housing having a cavity and an inner wall;
an elastic ball bearing received within the cavity, with the elastic ball bearing having a lower circumferential wall portion and an outer wall, and with the elastic ball bearing being axially moveable between a lifted up position in which the elastic ball bearing is free to flex such that a ball of the ball pin connector may be pushed in and be pulled out, and a lower locking position in which the elastic ball bearing rests with the lower circumferential wall portion on an inwardly directed wall projection of the housing at a lower opening of the housing which provides support for the lower circumferential wall portion of the elastic ball bearing around the lower opening such that the elastic ball bearing is prevented from flexing and such that the ball is prevented from being removed therefrom;
wherein the housing and the elastic ball bearing are provided with cooperating surface structures capable to be brought into engagement by relative rotation of the housing and the elastic ball bearing such that the elastic ball bearing is held in the lifted up position, and to be brought by relative rotation of the housing and the elastic ball bearing out of engagement such that elastic ball bearing is pressed down by a spring to the locking position; and
wherein the cooperating surface structures are provided on the inner wall of the housing and on the outer wall of the elastic ball bearing as a plurality of projecting surface structures arranged circumferentially distributed with gaps in between such that in a first rotational state of the elastic ball bearing within the housing the projecting surface structures are aligned to be able to come into engagement such that the elastic ball bearing is held in the lifted up position, and such that in a second rotational state of the elastic ball bearing the projecting surface structures of the elastic ball bearing are aligned with gaps of the projecting surface structures of the housing such that they may move past each other such that the elastic ball bearing, when the elastic ball bearing is pressed downwardly by the spring, is able to reach the locking position.

2. The ball pin connector according to claim 1, wherein the housing and the elastic ball bearing are provided with guiding surfaces that are arranged to, when the elastic ball bearing is moved upward in the housing upon the ball being inserted into the elastic ball bearing by exerting a force pushing the elastic ball bearing into the housing, drive the elastic ball bearing to rotate from the first rotational state towards the second rotational state within the housing, and to rotate from the second rotational state towards the first rotational state when the elastic ball bearing is moved upward in the housing the next time to remove the ball by exerting a force pushing the elastic ball bearing into the housing.

3. The ball pin connector according to claim 2, wherein at least some of the guiding surfaces are formed on the projecting surface structures.

4. The ball pin connector according to claim 2, wherein the guiding surfaces comprise inclined surface portions on the outer wall of the elastic ball bearing which are inclined with respect to the circumferential direction of the elastic ball bearing and which are not parallel to the axial direction of the elastic ball bearing, and that on the inner wall of the cavity protrusions are disposed which protrusions are arranged such that, when the elastic ball bearing is moved upward in the housing, the protrusions contact the inclined surface portions which causes the protrusions to slide along the inclined surface portions when the elastic ball bearing is further moved upward with respect to the housing, which sliding movement along the inclined surface structures causes the rotational movement of the elastic ball bearing between the first rotational state and the second rotational state and vice versa, respectively.

5. The ball pin connector according to claim 4, wherein the plurality of projecting surface structures on the outer wall of the elastic ball bearing are formed as a plurality of circumferentially spaced projections.

6. The ball pin connector according to claim 5, wherein the plurality of projecting surface structures on the outer wall of the elastic ball bearing are each in the form of a double arrow having a first arrow and a second arrow.

7. The ball pin connector according to claim 6, wherein each arrow of the double arrow has an arrow tip, with the arrow tips pointing in a circumferential direction of the elastic ball bearing.

8. The ball pin connector according to claim 7, wherein the second arrow has a base with the tip of the first arrow adjoining the base of the second arrow.

9. The ball pin connector according to claim 8, wherein the projecting surface structures on the inner wall of the housing comprise a plurality of circumferentially distributed lower projections disposed below the vertical level of the double arrows and arranged such that in the first rotational state of the elastic ball bearing a lower protrusion is disposed in the middle of an associated double arrow such that the lower protrusion engages the associated double arrow in an engagement area where the tip of the first arrow adjoins the base of the second arrow.

10. The ball pin connector according to claim 9, wherein the lower protrusions form part of the protrusions arranged to act on inclined sliding surfaces of the double arrows to rotate the elastic ball bearing within the housing cavity.

11. The ball pin connector according to claim 9, wherein the protrusions on the inner wall of the housing further comprise a plurality of upper protrusions located vertically above the double arrows on the ball bearing.

12. The ball pin connector according to claim 11, wherein the upper protrusions are circumferentially distributed and shifted with respect to the lower protrusions such that, when the elastic ball bearing in the first rotational state is moved upwardly within the housing, the upper protrusions contact upper inclined surface portions of the double arrows to cause a rotational movement of the elastic ball bearing within the housing sufficient to rotate the double arrows with their engagement areas where the first arrow adjoins with its tip the base of the second arrow circumferentially away from the lower protrusions.

13. The ball pin connector according to claim 12, wherein the plurality of upper and lower protrusions on the inner wall of the housing and the projecting double arrows on the outer wall of the elastic ball bearing are arranged such that, when the elastic ball bearing is in the first rotational state and is moved upwardly relative to the housing, the upper protrusions contact upper inclined surfaces portions of the double arrows to rotate the elastic ball bearing within the housing in a first step towards the second rotational state, and in that, when the elastic ball bearing is moved downwardly again, the lower protrusions contact lower inclined surface portions of the first arrows of the double arrows to rotate the elastic ball bearing further in a second step to the second rotational state.

14. The ball pin connector according to claim 12 wherein the plurality of upper and lower protrusions on the inner wall of the housing and the projecting double arrows on the outer wall of the elastic ball bearing are arranged such that, when the elastic ball bearing is in the second rotational state and is moved upward relative to the housing, the upper protrusions contact upper inclined surface portions of the double arrows to rotate the elastic ball bearing within the housing in a first step towards the second rotational state, and in that, when the elastic ball bearing is moved downwardly again, the lower protrusions contact lower inclined surface portions of the double arrows to rotate the elastic ball bearing further in a second step to the second rotational state in which the lower protrusions are engaged in the engagement areas of the double arrows.

* * * * *